Figure 4:
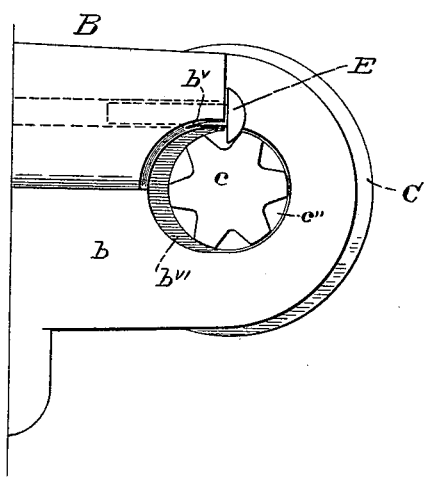

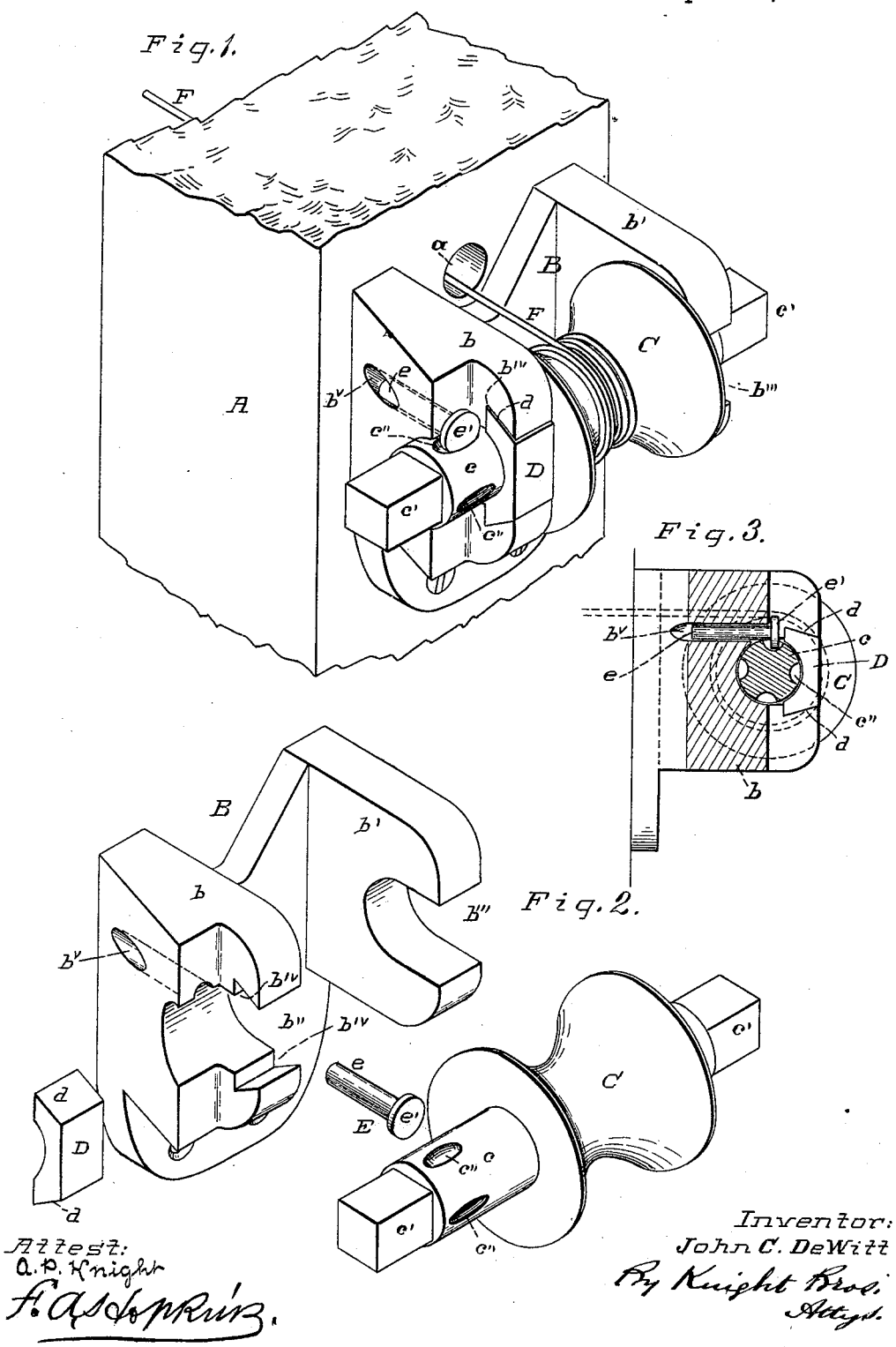

(No Model.)
2 Sheets—Sheet 2.

J. C. DE WITT.
WIRE STRETCHER.

No. 349,985. Patented Sept. 28, 1886.

Attest:
A. P. Knight
F. A. Hopkins

Inventor:
John C. DeWitt
By Knight Bros
Attys.

UNITED STATES PATENT OFFICE.

JOHN C. DEWITT, OF OWENSBOROUGH, KENTUCKY.

WIRE-STRETCHER.

SPECIFICATION forming part of Letters Patent No. 349,985, dated September 28, 1886.

Application filed June 17, 1886. Serial No. 205,467. (No model.)

*To all whom it may concern:*

Be it known that I, JOHN C. DEWITT, of Owensborough, Daviess county, Kentucky, have invented a new and useful Improvement in Wire-Stretchers, of which the following is a specification.

The object of my invention is to provide a cheap, simple, durable, and efficient device for stretching fence-wires and holding them taut.

In the accompanying drawings, Figure 1 is a perspective view of a wire-stretcher embodying my invention, the same being shown as stretching a wire and locked against back motion. Fig. 2 is a perspective view of the parts of said wire-stretcher detached. Fig. 3 is a vertical section through the locking device. Fig. 4 is an end view of a modification of my wire-stretcher.

A may represent a portion of a fence-post. B is a frame or bracket rigidly secured to the post A, and having projecting lugs $b$ $b'$ at its sides. In the lugs $b$ and $b'$, respectively, are slots $b''$ and $b'''$, of which each is open at its outer end and semicircular at its inner end, so as to serve as a journal-bearing for the shaft $c$ of the windlass or roller C. Said shaft having been inserted in the slots $b''$ and $b'''$, it is retained therein by a block, D, which is pushed alongside of the shaft into the outer part of the slot $b''$, and is held from coming out by its beveled or dovetailed ends $d$ engaging in correspondingly shaped grooves $b^{IV}$ in the slot-walls. The face of the block which bears against the shaft $c$ is semicircular, so as in conjunction with the back of the slot $b''$ to form a complete circular journal-bearing for the said shaft. The end of the fence-wire F is passed through a hole, $a$, in the post A and fastened to the windlass C. The shaft $c$ is squared, as at $c'$, at one or both ends to receive a wrench or crank, which, being turned, operates to wind the wire onto the roller C. The wire having by this means been stretched to the desired extent, the windlass C is detained from unwinding or turning back by inserting the shank $e$ of a nail or headed pin, E, of any kind into an orifice, $b^V$, in the lug $b$, the head $e'$ of the nail or pin being made to engage in one or other of a number of indentations, $c''$, in the shaft $c$, so as to lock said shaft.

For the headed pin E, I prefer to use a common rivet of proper shape and size. The shank of said headed pin is protected from moisture by being inclosed within the lug $b$, and even if it wears out it is readily and cheaply replaced. It will be seen that when the wire is drawn taut, the pin-head $e'$ serving as a fulcrum, the tension of the wire holds the shaft $c$ against the bearing-block D, which is thereby held firmly to its bearings against the lug $b$, and prevented from accidental displacement. The wedge-formed bearing-block D permits easy insertion and removal of the windlass-shaft, while allowing of long and closely-fitting bearings for the same. The form shown in Fig. 4 is a modification of the bearing-block, which is also adapted to the locking mechanism I have devised. Here the shaft $c$ is merely journaled in an orifice, $b'$, in the lug $b$, said orifice being made oblong to facilitate the insertion of the shaft. I however prefer the form shown in Figs. 1, 2, and 3.

I claim as new and of my invention—

1. In a wire-stretcher, the combination of bracket B, having lugs $b$ $b'$, provided with journal-bearings $b''$ $b'''$, and orifice $b^V$, windlass-shaft $c$, journaled in said bearings $b''$ $b'''$, and having indentations $c''$, and a headed pin, E, adapted to engage by its shank in the orifice $b^V$, and by its head in the indentations $c''$, substantially as and for the purpose set forth.

2. In a wire-stretcher, the combination of bracket B, having lugs $b$ $b'$, provided with open slots $b''$ $b'''$, of which slot $b''$ has in its walls dovetailed grooves $b^{IV}$, shaft $c$, occupying said slots $b''$ $b'''$, and wedge-formed block D, closing the slot $b''$ and bearing against the shaft $c$, and having beveled ends $d$ occupying the grooves $b^{IV}$, substantially as and for the purpose specified.

In testimony of which invention I hereunto set my hand.

JNO. C. DEWITT.

Attest:
C. F. MCCARRALL,
JOHN M. NEVITT.